United States Patent [19]

Yamamoto et al.

[11] Patent Number: 5,792,806
[45] Date of Patent: Aug. 11, 1998

[54] AQUEOUS COATING COMPOSITION

[75] Inventors: Yoshinori Yamamoto, Aichi-ken; Tuguo Nezu; Yoshinori Kato, both of Hiratsuka, all of Japan

[73] Assignee: Kansai Paint Company, Limited, Amagasaki, Japan

[21] Appl. No.: 712,755

[22] Filed: Sep. 12, 1996

Related U.S. Application Data

[60] Continuation of Ser. No. 382,377, Jan. 25, 1995, abandoned, which is a division of Ser. No. 94,518, Jul. 19, 1993, Pat. No. 5,428,088.

[30] Foreign Application Priority Data

Jul. 23, 1992 [JP] Japan ................. 4-217178

[51] Int. Cl.$^6$ ................................. C08K 5/52
[52] U.S. Cl. .................. 524/141; 524/140; 524/501; 524/507
[58] Field of Search .............. 524/140, 141, 524/501, 507

[56] References Cited

U.S. PATENT DOCUMENTS

| | | | |
|---|---|---|---|
| 4,129,553 | 12/1978 | Häberlein et al. | 260/45.85 R |
| 4,503,175 | 3/1985 | Houze et al. | 524/39 |
| 4,916,176 | 4/1990 | Vachlas et al. | 524/140 |
| 4,948,829 | 8/1990 | Mitsuji et al. | 524/457 |

FOREIGN PATENT DOCUMENTS

| | | | |
|---|---|---|---|
| 0206615 | 12/1986 | European Pat. Off. | 524/140 |
| 0138440 | 12/1978 | Japan | 524/140 |
| 0003869 | 1/1982 | Japan | 524/140 |
| 0070160 | 4/1982 | Japan | 524/140 |
| 3066266 | 3/1988 | Japan | 524/140 |
| 3243183 | 10/1988 | Japan | 524/140 |

*Primary Examiner*—Judy M. Reddick
*Attorney, Agent, or Firm*—Armstrong, Westerman, Hattori, McLeland & Naughton

[57] ABSTRACT

An aqueous coating composition which includes, as essential components thereof, (A) an acrylic resin emulsion, (B) a urethane resin emulsion, (C) a crosslinking agent and (D) an acidic phosphate or phosphite ester.

5 Claims, No Drawings

AQUEOUS COATING COMPOSITION

This application is a Continuation of application Ser. No. 08/382,377 filed Jan. 25, 1995, abandoned, which is a Divisional of application Ser. No. 08/094,518, filed Jul. 19, 1993, now U.S. Pat. No. 5,428,088.

The present invention relates to an aqueous coating composition and a coating method using the same. In particular, the invention relates to an aqueous coating composition suited for application to crosslink-cured paint film surfaces.

To apply a paint or coating composition further to the cured top coat surface is a practice so far made in many instances, for example in repair painting or multicolor finishing of the body panels of motor vehicles and the like. Thus, once the occurrence of a paint film defect, such as foreign matter or foreign particle inclusion, spitting, cratering, cissing or crawling, has been detected in the motor vehicle coating line or the like, the top coat surface including the site of said defect is recoated to eliminate the defect. This is the so-called repair painting. It is not rare that the area to be recoated covers the whole surface of a motor vehicle body panel or the like. Multicolor finishing, or the so-called two-tone finishing, is a coating process comprising applying two or more paint compositions differing in color to the cured top coat surface to thereby finish one and the same surface with a plurality of colors.

On the other hand, in recent years, the top coat paint film (clear paint film or solid color paint film) on motor vehicles and the like has been made hard with a high crosslink density and the surface thereof inactive to attain improved acid resistance and/or scratch resistance, for instance. Therefore, the problem of insufficient interlayer adhesion between the two paint films is often encountered upon application of a coating composition to such a hard and inactive top coat surface for the purpose of repair painting or multicolor finishing as mentioned above. Even when the aqueous coating composition disclosed in U.S. Pat. No. 4,948,829, namely an aqueous coating composition which is characterized in that the composition comprises:

(A) an acrylic resin-type emulsion, (B) a urethane resin-type emulsion and (C) a crosslinking agent, the component (B) being a self-emulsifiable urethane emulsion prepared by subjecting a urethane prepolymer to reaction for chain extension by water and to emulsification after or during neutralization of the urethane prepolymer with a tertiary amine, the urethane prepolymer consisting essentially of (i) an aliphatic and/or alicyclic diisocyanate, (ii) a polyether diol and/or polyester diol both having a number-average molecular weight of about 500 to about 5000, (iii) a low-molecular weight polyhydroxyl compound and (iv) a dimethylolalkanoic acid in an NCO/OH ratio by equivalent of 1.1.–1.9/1, is applied to the top coat surface, the interlayer adhesion between both paint films is not sufficient as yet (cf. Comparative Examples 1 and 2 given later herein).

To improve the above-mentioned interlayer adhesion between successive paint films, several measures have been tried: for example, the crosslinking agent content in coating compositions for repair painting or multicolor finishing is increased, or the base resin is made soft so that it can have a capacity for stress relaxation. None of such measures, however, is satisfactory. A drastic measure for improvement is therefore earnestly demanded.

Accordingly, it is an object of the present invention to provide an aqueous coating composition which has excellent adhesion to hard and inactive paint film surfaces having a high crosslink density and which contains water as a main solvent or dispersion medium.

The invention provides: (1) an aqueous coating composition which comprises (A) an acrylic resin-type emulsion, (B) a urethane resin-type emulsion, (C) a crosslinking agent and (D) an acidic phosphate or phosphite ester and (2) a method of coating which comprises applying on cured painted surfaces an aqueous coating composition comprising (A) an acrylic resin-type emulsion, (B) a urethane resin-type emulsion, (C) a crosslinking agent and (D) an acidic phosphate or phosphite ester.

First, the aqueous coating composition of the present invention will be described below in detail.

The coating composition of the invention comprises (A) an acrylic resin-type emulsion, (B) a urethane resin-type emulsion, (C) a crosslinking agent and (D) an acidic phospate or phosphite ester as essential components.

(1) Component (A): Acrylic resin-type emulsion

This emulsion has acrylic resin particles uniformly dispersed in an aqueous medium. The emulsion can be prepared by subjecting an acrylic monomer to emulsion polymerization in an aqueous solution of a dispersion stabilizer.

Examples of dispersion stabilizers useful in the polymerization are polyoxyethylene nonyl phenyl ether and like nonionic surfactants, polyoxyethylene alkyl aryl ether sulfuric acid ester salt and like anionic surfactants, and acrylic resins and like water-soluble resins about 20 to about 150 in acid value and about 5000 to about 30000 in number-average molecular weight.

The aqueous medium is a solution of the dispersion stabilizer in water.

The acrylic monomer for use in emulsion polymerization in the aqueous medium is at least one monomer selected from: esters of acrylic or methacrylic acid and monohydric alcohol having 1 to 20 carbon atoms, examples of said esters being methyl acrylate or methacrylate, ethyl acrylate or methacrylate, propyl acrylate or methacrylate, butyl acrylate or methacrylate, 2-ethylhexyl acrylate or methacrylate and the like; compounds having two or more polymerizable double bonds per molecule and prepared by reacting an acrylic or methacrylic acid with a dihydric or polyhydric alcohol having 2 to 16 carbon atoms, examples of such compounds being ethylene glycol diacrylate or dimethacrylate, hexanediol diacrylate or dimethacrylate, trimethylolpropane diacrylate or dimethacrylate, allyl acrylate or methacrylate, trimethylolpropane triacrylate or trimethacrylate and the like; hydroxy-containing alkyl ($C_{2-10}$) acrylate or methacrylate such as hydroxyethyl acrylate or methacrylate, hydroxypropyl acrylate or methacrylate and the like; etc.

These acrylic monomers can be used conjointly with other monomers copolymerizable therewith. Examples of such monomers are $\alpha,\beta$-ethylenically unsaturated carboxylic acids such as acrylic or methacrylic acid and like monocarboxylic acids, maleic acid, fumaric acid, itaconic acid and like dicarboxylic acids and half-esters of these dicarboxylic acids; N-propoxymethyl acrylamide or methacrylamide, N-butoxymethyl acrylamide or methacrylamide, glycidyl acrylate or methacrylate, styrene and vinyl acetate, etc. among which the monomers having hydroxyl or like crosslinkable functional group are preferred to enhance the crosslinking reactivity between the monomer and the component (C) to be described later.

It is preferred to use as the component (A) an emulsion prepared by subjecting to emulsion polymerization the $\alpha,\beta$-ethylenically unsaturated carboxylic acid and the acrylic monomer. The emulsion prepared by a multistage polymerization process gives a coating composition improved in amenability to coating operation, hence desirable. That is, an acrylic monomer containing a small amount of (e.g. about 3% by weight or less) or no α,β-ethylenically unsaturated carboxylic acid is polymerized and the resulting polymer is subsequently copolymerized with an acrylic monomer containing a large amount (e.g. about 5 to about 30% by weight) of α,β-ethylenically unsaturated carboxylic acid. The emulsion obtained increases in viscosity by neutralizing the unsaturated acid with a neutralizing agent and is therefore desirable also in view of the amenability to coating operation (prevention of sagging or mottling). Examples of useful neutralizing agents are ammonia and water-soluble amino compounds such as monoethanolamine, ethylamine, 2-amino-2-methylpropanol, dimethylamine, diethylamine, triethylamine, propylamine, dipropylamine, isopropylamine, diisopropylamine, diethanolamine, triethanolamine, butylamine, dibutylamine, 2-ethylhexylamine, ethylenediamine, propylenediamine, methylethanolamine, dimethylethanolamine, diethylethanolamine and morpholine. Among them, triethylamine, dimethylethanolamine and like tertiary amines, diethanolamine, 2-amino-2-methylpropanol and the like are especially desirable. Also usable to fulfill the objects of the invention is the component (A) having a viscosity increased by addition of neutralized acrylic resin of high acid value or a thickener.

Preferably the dispersed resin particles in the component (A) formed by emulsion polymerization are crosslinked ones in view of mechanical stability, storage stability and the like. The crosslinked dispersed resin particles can be formed, for example, by emulsion-polymerizing a mixture of two kinds of monomer, i.e. a monomer having one polymerizable unsaturated bond per molecule and a monomer having two or more polymerizable unsaturated bonds per molecule. While the proportions of the two monomers are not specifically limited usually about 15% by weight or less, preferably about 5% by weight or less, of the latter is used based on the combined amount of the two monomers.

The dispersed resin particles predominantly composed of acrylic monomer in the component (A) are preferably those having a mean particle size of about 0.05 to about 1.0 μm.

(2) Component (B): Urethane resin-type emulsion

The component (B) of the invention is an aqueous dispersion of self-emulsifiable urethane resin of about 0.001 to about 1.0 μm in mean particle size prepared by the following method. First a urethane prepolymer is synthesized by subjecting to a one-shot or multi-stage polymerization (optionally in a hydrophilic organic solvent free of active hydrogen): (i) an aliphatic and/or alicyclic diisocyanate, (ii) a polyether diol or polyester diol both having a number-average molecular weight of about 500 to about 5000 or a mixture thereof, (iii) a low-molecular weight polyhydroxyl compound and (iv) a dimethylolalkanoic acid in an NCO/OH equivalent ratio 1.1-1.9:1. The prepolymer thus obtained is mixed with water after or during neutralization of prepolymer with a tertiary amine, and the resulting mixture is subjected to reaction for chain extension by water while being emulsified and dispersed in water. Thereafter, when required, the organic solvent is distilled off.

Examples of the component (i) for use in the preparation of the urethane prepolymer, i.e., aliphatic or alicyclic diisocyanate, include aliphatic diisocyanates having 2 to 12 carbon atoms such as hexamethylene diisocyanate, 2,2,4-trimethylhexane diisocyanate and lysine diisocyanate; alicyclic diisocyanates having 4 to 18 carbon atoms such as 1,4-cyclohexane diisocyanate, 1-isocyanato-3-isocyanatomethyl-3,5,5-trimethylcyclohexane (isophorone diisocyanate), 4,4'-dicyclohexylmethane diisocyanate, methylcyclohexylene diisocyanate and isopropylidene dicyclohexyl-4,4'-diisocyanate; modified products of these diisocyanates (such as those containing carbodimide, uretdione, uretone imine or the like); mixtures of at least two of them; etc. Among them, preferred are alicyclic diisocyanates, especially 1,4-cyclohexane diisocyanate, 1-isocyanato-3-isocyanatomethyl- 3,5,5-trimethylcyclohexane and 4,4'-dicyclohexylmethane diisocyanate.

The use of aromatic diisocyanate as the component (i) tends to yellow the coating being baked for curing and to cause the discoloration of coating exposed to ultraviolet light, and hence is undesirable.

Examples of the component (ii) for use in the preparation of the urethane prepolymer, i.e., polyether diols and polyester diols both having a number-average molecular weight of about 500 to about 5000, preferably 1000 to 3000, include those prepared by polymerizing or copolymerizing alkylene oxide (such as ethylene oxide, propylene oxide, butylene oxide or the like) and/or a heterocyclic ether (such as tetrahydrofuran or the like), examples of resulting polymers being polyethylene glycol, polypropylene glycol, polyethylene-propylene (block or random) glycol, polytetramethylene ether glycol, polyhexamethylene ether glycol and polyoctamethylene ether glycol; condensation polymers of dicarboxylic acid (such as adipic acid, succinic acid, sebatic acid, glutaric acid, maleic acid, fumaric acid, phthalic acid or the like) with glycol (such as ethylene glycol, propylene glycol, 1,4-butanediol, 1,6-hexanediol, 3-methyl-1,5-pentanediol, neopentyl glycol, bishydroxymethylcyclohexane or the like), examples of the condensation polymers being polyethylene adipate, polybutylene adipate, polyhexamethylene adipate, polyneopenty adipate, poly-3-methylpentyl adipate, polyethylene/butylene adipate and polyneopentyl/hexyl adipate; polylactone diols such as polycaprolactone diol and poly-3-methylvalerolactone diol; polycarbonate diols; mixtures of at least two of them; etc.

Examples of the component (iii) for use in the preparation of the urethane prepolymer, i.e., low-molecular weight polyhydroxyl compounds, include those of 500 or less in number-average molecular weight, e.g. glycols as exemplified above as the material for the polyester diol and low-molecular weight addition products (number-average molecular weight of 500 or less) of the glycol with alkylene oxide; trihydric alcohols such as glycerin, trimethylol ethane, trimethylol propane and the like and low-molecular weight addition products (number-average molecular weight of 500 or less) of the alcohol with alkylene oxide; mixtures of at least two of them; etc. The low-molecular weight polyhydroxyl compound is used in an amount of about 0.1 to about 20% by weight, preferably about 0.5 to about 10% by weight, based on the polyether diol or polyester diol.

Examples of the component (iv) for use in the preparation of the urethane prepolymer, i.e., di-methylolalkanoic acid, include dimethylolacetic acid, dimethylolpropionic acid, dimethylolbutyric acid, etc. among which dimethylolpropionic acid is preferred. The dimethylolalkanoic acid is used in an amount of about 0.5 to about 5% by weight, preferably about 1 to about 3% by weight (calculated as the carboxyl group), based on the urethane prepolymer prepared by reacting the components (i) to (iv). If the amount of carboxyl group is less than about 0.5% by weight, it is difficult to prepare a stable emulsion. However, if the amount exceeds 5% by weight, the hydrophilic property is increased, rendering the emulsion highly viscous and decreasing the water resistance of coating.

Examples of tertiary amines useful for neutralization of dimethylolalkanoic acid are trialkylamines such as trimethylamine, triethylamine, triisopropylamine, tri-n-propylamine, and tri-n-butylamine; N-alkylmorpholines such as N-methylmorpholine and N-ethylmorpholine; N-dialkylalkanolamines such as N-dimethylethanolamine and N-diethylethanolamine; mixtures of at least two of them; etc. Among them, preferable is trialkylamine and more preferable is triethylamine. The neutralization degree of tertiary amine is about 0.5 to about 1 equivalent, preferably about 0.7 to about 1 equivalent, per equivalent of carboxyl group of dimethylolalkanoic acid.

(3) Component (C): Crosslinking agent

The crosslinking agent is used for crosslinking and curing the component (A) and/or (B). Melamine resins and phenolformaldehyde resins for coating materials are suitable for use. While water-soluble or hydrophobic crosslinking agents are usable, a hydrophobic one is preferably used to improve the amenability to coating operation, storage stability, humidity resistance and the like.

Hydrophobic melamine resins suitable for use herein are those having a solvent dilution ratio of about 20 or less, preferably about 15 or less and a weight-average molecular weight of about 800 to about 4000, preferably about 1000 to about 3000. The solvent dilution ratio used in the present invention is an index indicating the solubility of melamine resin in hydrophilic solvents. The lower the ratio, the more hydrophobic is the resin. The solvent dilution ratio is determined by the following method. Two grams of melamine resin is placed into a 50 cc beaker which is then placed on paper bearing a print of No.5 type Subsequently, at 25° C. a mixture of water and methanol (35/65 in weight ratio) is added dropwise to the resin with stirring until the print becomes illegible. The amount (cc) thus added is divided by the amount of the melamine resin to obtain a value (cc/g) as the ratio.

The melamine resin is not limited specifically insofar as it fulfills the solvent dilution ratio and molecular weight requirements. The resin is usable as etherified variously, for example, as modified with at least one of methyl alcohol, ethyl alcohol, isopropyl alcohol, n-butyl alcohol, isobutyl alcohol, octyl alcohol, 2-ethylhexyl alcohol, benzyl alcohol, etc. According to the invention, it is suitable to use the resin as modified with an alcohol having at least four carbon atoms, more preferably four to seven carbon atoms. The amount of ether groups in the melamine resin, although not limited specifically, is suitably up to about 5 moles, preferably about 1.5 to about 3 moles, per triazine ring. Further as to the functional groups such as amino, imino and methylol, the kind and amount of remaining functional groups are not limited specifically provided that the foregoing solvent dilution ratio and molecular weight requirements are satisfied. Usually, however, the amount of imino groups (inclusive of amino groups), as well as of methylol groups, is about 0.2 to about 2 moles, preferably about 0.5 to about 1.5 moles, per triazine ring.

The hydrophobic crosslinking agent is preferably mixed with a water-soluble resin before mixing with the components (A) and (B).

The aqueous coating composition of the invention contains the components (A) to (C) in the following proportions (on the solid weight basis). The component (A)/component (B) ratio is preferably between 90/10 and 60/40, more preferably between 90/20 and 62/38. The ratio of mixture of components (A) and (B)/component (C) ranges preferably between 95/5 and 60/40, more preferably between 90/10 and 70/30, in application of the aqueous coating composition to metallic substrates and ranges preferably between 90/10 and 20/80, more preferably between 80/20 and 30/70, in application thereof to plastics substrates.

(4) Component (D): Acidic phosphate or phosphite ester

As examples of the component (D) that can suitably be used in the practice of the invention, there may be mentioned compounds of the general formula (I) or (II) given below. One or two or more compounds selected from these compounds can be used.

General formula (I):

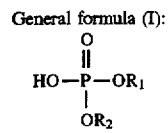

General formula (II):

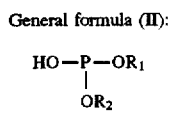

In the above general formulas (I) and (II), $R_1$ and $R_2$ are each a hydrogen atom or a univalent organic group containing 1 to 20 carbon atoms, one of $R_1$ and $R_2$ preferably being such organic group.

Examples of the organic group represented by $R_1$ and/or $R_2$ in general formulas (I) and (II) are alkyl groups such as methyl, ethyl, propyl, butyl, hexyl, 2-ethylhexyl, octyl, lauryl and stearyl; aryl groups such as phenyl, tolyl, xylyl and naphthyl; aralkyl groups such as benzyl, phenylethyl, methylbenzyl and naphthylbenzyl; alkenyl groups such as vinyl, allyl and oleyl; cycloalkenyl groups such as cyclopentadienyl and 2-cyclobutenyl; allcenylaryl groups such as vinylphenyl; and the like. Among them, alkyl group and aryl group are particularly preferred.

In the practice of the invention, the proportion of the component (D) is not critical. Preferably, however, said proportion (on the solid basis) is within the range of about 0.01 to about 5 parts by weight, more preferably about 0.1 to about 3 parts by weight, per 100 parts by weight of the total of the above-mentioned components (A), (B) and (C).

The coating composition of the invention comprises the above-mentioned components (A), (B), (C) and (D) and can be prepared by dissolving or dispersing them in water or a mixed system composed of water and an organic solvent. Said composition may contain such additives as a metallic pigment, a coloring pigment, a thickener and an antifoam. These components can be incorporated into the composition by any appropriate method, for example using a dissolver, homomixer, ball mill, sand mill or the like.

Examples of useful metallic pigments are aluminum flake, copper bronze flake, micaceous iron oxide, mica flake, metallic oxide-coated macaceous iron oxide, metallic oxide-coated mica flake, etc. Examples of useful coloring pigments are titanium dioxide, iron oxide, chromium oxide, lead chromate, carbon black and like inorganic pigments, Phthalocyanine Blue, Phthalocyanine Green, Carbazole Violet, Anthrapyrimidine Yellow, Flavanthrone Yellow, Isoindoline Yellow, Indanthrone Blue, Quinacridone Violet and like organic pigments.

The aqueous coating composition of the invention can be applied directly to metallic, plastics and like substrates as well as to primer, intermediate coat or top coat surfaces already applied beforehand. Outer panels of automobiles and electrical appliances, among others, are suitable substrates to be coated with said composition. The technological effects of the coating composition of the invention are produced particularly when said composition is applied to cured paint film surfaces (hereinafter referred to as "hard painted surfaces") having an increased crosslink density and an increased hardness for improving the acid resistance, scratch resistance, etc. For maintaining these performance characteristics, said hard painted surfaces inevitably have an increased crosslink density and an increased hardness and, as a result, the cured painted surfaces become inactive. Thus, in the prior art, the adhesion of the paint film applied to said painted surfaces has been insufficient. On the contrary, the cured paint films formed by the coating composition of the invention are much superior in the adhesion to such hard painted surfaces to the conventional coating compositions. As regards other paint film performance characteristics (e.g. physical properties, chemical properties, etc.), the coating composition of the invention can attain practical levels or even higher. Said hard painted surfaces are the surfaces of painted films cured by using a plurality of different curing reactions combinedly while employing a low level of hydroxyl value and of intercrosslink molecular weight (of cured paint films) for attaining improvements in acid resistance, scratch resistance, etc. These are causative factors in decreasing the recoatability or adhesion upon recoating. Such hard painted surfaces, by nature, may not require recoating. However, in the above-mentioned cases of repair painting and multicolor finishing, for instance, said hard painted surfaces have a good chance for recoating.

For repair painting with the coating composition of the invention, per se known methods and techniques can be used. Thus, for instance, when the hard painted surfaces have a solid color, the coating composition (solid color) of the invention having the same finish color is directly applied to the portion to be repaired, if necessary followed by further application of a clear coating composition (e.g. one coat-one bake, two-coat one-bake, or two-coat two-bake finishing). When the hard painted surfaces are metallic, the coating composition of the invention matched to the same finish color as that of said metallic painted surfaces is applied to the repair-requiring portion of the clear painted surfaces, followed by application of a clear coating composition (which may be included in the coating composition of the invention) (e.g. two-coat one-bake or two-coat two-bake finishing).

In multicolor finishing with the coating composition of the invention, per se known methods and techniques can be used. Thus, for two-tone finishing of a monotone hard painted surface already existing, the painted surface except for the portions to be finished in a different color is masked, then the coating composition of the invention matched to the desired color is applied to the unmasked regions on the hard painted surface, the new paint film is cured and the masking is eliminated to attain two-tone finishing. Finishing in three or more colors can be conducted in the same manner.

The coating composition of the invention can be applied directly to metal, plastics and wooden substrates, for instance, or to primer, intermediate coat or top coat surfaces or like surfaces already existing. In particular when the coating composition of the invention is used for coating paint films increased in hardness (generally at least H as expressed in pencil hardness at 25° C.) and in crosslink density for improvement in acid resistance and scratch resistance, the technical effects of the invention can be produced to the fullest extent, hence advantageous. Furthermore, the coating composition of the invention can be applied to such hard painted surfaces without sanding the painted surfaces. When coated with the conventional coating compositions, these hard painted surfaces, which are relatively inactive, give only insufficient adhesion, making repair coating or multicolor finishing thereof difficult. The coating composition of the invention, which is an aqueous composition, is effective in resources saving and pollution control and the paint films formed therefrom show excellent physical and chemical properties.

The following examples are further illustrative of the present invention. Unless otherwise specified, "part(s)" and "%" are on the weight basis.

PREPARATION EXAMPLE (1) Component (A)

Preparation of acrylic resin-type emulsion (A-1)

Into a reactor were placed 140 parts of deionized water, 2.5 parts of 30% "Newcol 707SF" (anionic surfactant, product of Nippon Nyukazai Co., Ltd.) and 1 part of the monomer mixture (1) given below, followed by stirring in a nitrogen stream, and further by addition of 3 parts of 3% ammonium persulfate aqueous solution at 60° C. Subsequently, the mixture was heated to a temperature of 80° C. A monomer emulsion comprising 79 parts of the monomer mixture (1), 2.5 parts of 30% "Newcol 707SF", 4 parts of 3% ammonium persulfate and 42 parts of deionized water was thereafter placed into the reactor by a metering pump over a period of 4 hours. After the completion of addition, the mixture was aged for 1 hour.

At 80° C., 20.5 parts of the following monomer mixture (2) and 4 parts of 3% aqueous solution of ammonium persulfate were concurrently placed dropwise into the reactor over a period of 1.5 hours. After the completion of addition, the resulting mixture was aged for 1 hour, then diluted with 30 parts of deionized water and filtered with 200-mesh nylon cloth at 30° C. Deionized water was added to the filtrate, and the pH of the mixture was adjusted to 7.5 with dimethylaminoethanolamine, giving an acryic resin-type emulsion (A-1) containing particles with a mean particle size of 0.1 μm and having a nonvolatile content of 20%.

| Monomer mixture (1) | |
|---|---|
| Methyl methacrylate | 55 parts |
| Styrene | 8 parts |
| n-Butyl acrylate | 9 parts |
| 2-Hydroxyethyl acrylate | 5 parts |
| 1,6-Hexanediol diacrylate | 2 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |
| 30% "Newcol 707SF" | 0.5 part |

(2) Component (B)

Preparation of urethane resin-type emulsion (B-1)

A reactor for polymerization was charged with 115.5 parts of polybutylene adipate of 2000 in number-average molecular weight, 115.5 parts of polycaprolactone diol of 2000 in number-average molecular weight, 23.2 parts of dimethylolpropionic acid, 6.5 parts of 1,4-butanediol and 120 parts of 1-isocyanato-3-isocyanatomethyl-3,5,5-trimethylcyclohexane (IPDI). The mixture was reacted in nitrogen atmosphere with stirring at 85° C. for 7 hours, giving an NCO-terminated prepolymer containing 4.0% NCO. The prepolymer was cooled to 50° C. and was homogeneously dissolved in 165 parts of acetone. Then 15.7 parts of triethylamine was added with stirring. While maintaining the mixture at 50° C. or lower, 600 parts of ion exchange water was added. The obtained aqueous dispersion was held at 50° C. for 2 hours to complete the reaction for chain extension by water. The acetone was distilled off at 70° C. or lower under reduced pressure, giving a urethane resin-type emulsion (B-1) containing 42.0% solids.

(3) Component (C)

Preparation of crosslinking agent (C-1)

Into a stirring container was placed 41.7 parts of a commercial hydrophobic melamine resin ("Uban 28SE," product of Mitsui Toatsu Chemical Co., Ltd., nonvolatile content 60%, solvent dilution ratio 0.4). The aqueous acrylic resin solution (20 parts) obtained below was added to the resin. While stirring the mixture by a dissolver at 1000 to 1500 r.p.m., 80 parts of deionized water was added in small portions to the mixture, followed by further stirring for 30 minutes to obtain a crosslinking agent (C-1) in the form of an aqueous dispersion containing particles of 0.11 μm in mean particle size.

Preparation of aqueous acrylic resin solution

In a reactor were placed 60 parts of butyl cellosolve and 15 parts of isobutyl alcohol, followed by heating to 115° C. in nitrogen atmosphere. A mixture composed of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile was then added at the same temperature over 3 hours. The resulting mixture was aged at the same temperature for 30 minutes, then a mixture of 1 part of azobisisobutyronitrile and 115 parts of butyl cellosolve was added over 1 hour and, after 30 minutes of aging, the reaction mixture was filtered through a 200-mesh nylon cloth. The reaction mixture obtained had an acid value of 48, a viscosity of $Z_4$ (Gardner bubble viscometer/25° C.) and a solid content of 55%. This mixture was neutralized with an equivalent amount of dimethylethanolamine and then diluted with deionized water to give an aqueous acrylic resin solution with a solid content of 50%.

EXAMPLES 1–3 & COMPARATIVE EXAMPLES 1–2

In each example, the components specified below in Table 1 were made into a mixture by adding them one after another with stirring in the proportions (on the solid basis) specified in Table 1. The mixture was further stirred for 1 hour to give an aqueous coating composition of the invention or for comparison.

TABLE 1

|  | Example | | | Comparative Example | |
|---|---|---|---|---|---|
|  | 1 | 2 | 3 | 1 | 2 |
| (A-1) | 60 | 60 | 60 | 60 | 50 |
| (B-1) | 20 | 20 | 20 | 20 | 20 |
| (C-1) | 20 | 20 | 20 | 20 | 30 |
| (D-1) | 1 | 2 | — | — | — |
| (D-2) | — | — | 2 | — | — |

The component (D) mentioned in Table 1 had the following composition:

(D-1): Phenyl phosphate;
(D-2): Octyl acid phosphate

The above aqueous compositions were each adjusted to a solid content of 20% and a viscosity of 2.000 mpa.s (25° C.) using deionized water and a thickener (Acrysol ASE-60, product of Rohm and Haas Co.).

PERFORMANCE TEST RESULTS

The above aqueous coating compositions were each applied to the surface of a hard painted film, cured and tested for paint film performance characteristids.

The hard painted film was a paint film formed by applying a top coat composition improved in acid resistance and scratch resistance to the surface of an intermediate coat cured by heating successively a cationic electrodeposition paint and an intercoating composition on a surface-treated stainless steel plate. The top coat surface had a pencil hardness of 3H (20° C.).

Each aqueous coating composition was applied to said hard painted surface to a film thickness (after curing) of 35 to 40 μm and, after 10 minutes of standing at room temperature, the paint film was cured by heating at 160° C. for 30 minutes. The aqueous coating compositions of the present invention were evaluated by testing the painted plates prepared in the above manner for paint film performance characteristics. The results obtained are shown in Table 2.

TABLE 2

|  |  |  | Example | | | Comparative Example | |
|---|---|---|---|---|---|---|---|
|  |  |  | 1 | 2 | 3 | 1 | 2 |
| Adhesiveness upon recoating |  |  | 100 | 100 | 100 | 50 | 55 |
| Water resistance | Appearance |  | o | o | o | o | o |
|  | Adhesiveness |  | 100 | 100 | 100 | 30 | 25 |
| Finish appearance |  |  | o | o | o | o | o |
| Storage stability | Viscosity | Initial | 2000 | 2000 | 2000 | 2000 | 2000 |
|  |  | After storage | 2200 | 2200 | 2250 | 2100 | 2150 |
|  | pH | Initial | 8.30 | 8.30 | 8.30 | 8.30 | 8.30 |
|  |  | After storage | 8.05 | 8.10 | 8.07 | 8.09 | 8.10 |

The following test methods were used.

Adhesiveness upon recoating: After curing of the top coat film by heating at 160° C. for 30 minutes for hard painted surface formation, the aqueous coating composition of the invention (or for comparison) was applied and cured by heating at 120° C. for 30 minutes and the cured paint film was tested for adhesiveness by the cross-cut method using an adhesive cellophane tape for peeling as described in JIS K 5400. The numerical values given in Table 2 indicate the respective numbers of remaining squares (1×1 mm) out of the total of 100 after peeling off the tape, 100 being the best.

Water resistance: The painted plate was immersed in water at 80° C. for 24 hours and then submitted to evaluation of the paint film appearance and to cross-cut adhesion testing in the same manner as mentioned above.

Finish appearance: The paint film was evaluated by the eye in terms of gloss, apparent thickness, etc. The symbol o indicates that the paint film is good in the above respect.

Storage stability: Each aqueous coating composition of the invention (or for comparison) was stored at 40° C. for 10 days and then examined for change in viscosity and in pH.

What is claimed is:

1. An aqueous coating composition which comprises, as essential components thereof, (A) an acrylic resin emulsion, (B) a urethane resin emulsion, (C) a crosslinking agent and (D) an acidic phosphate compound represented by the formula (I):

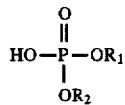

wherein $R_1$ and $R_2$ are each a hydrogen atom or a univalent organic group containing 1 to 20 carbon atoms, wherein the ratio of component (A)/component (B) is between 90/10 and 60/40, the ratio of components (A) and (B)/component (C) is between 95/5 and 60/40, and the proportion of component (D) is within the range of 0.01 to 5 parts by weight per 100 parts by weight of the total of component (A), (B) and (C).

2. An aqueous coating composition according to claim 1 wherein the acrylic resin emulsion (A) is a hydroxy group-containing acrylic resin emulsion prepared by subjecting to emulsion polymerization at least one acrylic monomer selected from the group consisting of hydroxy group-containing ($C_2$–$C_{10}$ alkyl)acrylates and hydroxy group-containing ($C_2$–$C_{10}$ alkyl)methacrylates.

3. An aqueous coating composition according to claim 2 wherein the hydroxy group-containing acrylic resin emulsion is prepared by subjecting to emulsion polymerization the acrylic monomer and $\alpha,\beta$-ethylenically unsaturated carboxylic acid.

4. An aqueous coating composition according to claim 1 wherein the urethane resin emulsion (B) is a self-emulsifiable urethane emulsion prepared by reacting a urethane prepolymer with water, neutralizing the urethane prepolymer with a tertiary amine, and emulsifying the urethane prepolymer either during or after the neutralization step, the urethane prepolymer consisting essentially of (i) at least one aliphatic or alicyclic diisocyanate, (ii) at least one polyether diol or polyester diol, both having a number-average molecular weight of about 500 to about 5,000, (iii) a polyhydroxyl compound having a number-average molecular weight of 500 or less and (iv) a dimethylolalkanoic acid present in an NCO/OH equivalent ratio of 1.1–1.9:1, wherein the NCO/OH equivalent ratio means the ratio of the amount of NCO in (i) the diisocyanate to the total amount of OH in (ii) the polyether diol and/or polyester diol, (iii) the polyhydroxy compound and (iv) the dimethylolalkanoic acid.

5. An aqueous coating composition according to claim 1 wherein the crosslinking agent (C) is a hydrophobic melamine resin.

* * * * *